United States Patent
Torii et al.

(10) Patent No.: US 11,352,090 B2
(45) Date of Patent: Jun. 7, 2022

(54) INFORMATION PROVIDING DEVICE AND PROGRAM FOR MOTORCYCLE

(71) Applicant: Robert Bosch GmbH, Stuttgart (DE)

(72) Inventors: Takehito Torii, Kanagawa (JP); Yasushi Yui, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 569 days.

(21) Appl. No.: 15/329,307

(22) PCT Filed: Jun. 12, 2015

(86) PCT No.: PCT/JP2015/066993
§ 371 (c)(1),
(2) Date: Jan. 26, 2017

(87) PCT Pub. No.: WO2016/017297
PCT Pub. Date: Feb. 4, 2016

(65) Prior Publication Data
US 2017/0225619 A1    Aug. 10, 2017

(30) Foreign Application Priority Data

Jul. 28, 2014 (JP) .............................. JP2014-153291

(51) Int. Cl.
*B62J 50/21* (2020.01)
*B60R 21/00* (2006.01)
(Continued)

(52) U.S. Cl.
CPC ................. *B62J 50/21* (2020.02); *B60R 1/00* (2013.01); *B60R 21/00* (2013.01);
(Continued)

(58) Field of Classification Search
CPC .............. B60R 1/00; B60R 2300/8093; B60R 2300/804; G06K 9/00798; B62J 99/00; B62J 2099/002
See application file for complete search history.

(56) References Cited

U.S. PATENT DOCUMENTS

| | | | |
|---|---|---|---|
| 2007/0131471 A1* | 6/2007 | Ehmanns | B60K 31/042 180/335 |
| 2010/0076684 A1* | 3/2010 | Schiffmann | G01S 13/931 701/301 |

(Continued)

FOREIGN PATENT DOCUMENTS

| | | |
|---|---|---|
| CN | 101073018 A | 11/2007 |
| CN | 101778753 A | 7/2010 |

(Continued)

OTHER PUBLICATIONS

Slimi (Proceedings of the 12th International IEEE Conference on Intelligent Transportation Systems, St. Louis, MO, USA, Oct. 3-7, 2009) (Year: 2009).*

(Continued)

*Primary Examiner* — Nasim N Nirjhar
(74) *Attorney, Agent, or Firm* — Michael Best & Friedrich LLP

(57) ABSTRACT

An information providing device 1 of a motorcycle includes: an image acquisition section 10 that acquires an image of a road; a lane detection section 12 that detects a lane from the image and detects a radius of curvature of the detected lane and a lateral distance from the host vehicle to the lane; a host vehicle trajectory curvature calculation section 14 that calculates a radius of curvature of a host vehicle trajectory on the basis of the radius of curvature of the lane and the lateral distance; a vehicle speed acquisition section 16 that acquires a vehicle speed of the host vehicle; an inclination angle calculation section 18 that calculates an inclination angle of (Continued)

the host vehicle on the basis of the radius of curvature of the host vehicle trajectory and the vehicle speed.

8 Claims, 7 Drawing Sheets

(51) Int. Cl.
| | |
|---|---|
| G08G 1/16 | (2006.01) |
| B60W 50/14 | (2020.01) |
| B60W 30/095 | (2012.01) |
| G06V 20/56 | (2022.01) |
| B60R 1/00 | (2022.01) |
| B62J 45/412 | (2020.01) |

(52) U.S. Cl.
CPC ........ *B60W 30/0956* (2013.01); *B60W 50/14* (2013.01); *G06V 20/588* (2022.01); *G08G 1/166* (2013.01); *G08G 1/167* (2013.01); *B60R 2300/804* (2013.01); *B60R 2300/8093* (2013.01); *B60W 2300/36* (2013.01); *B60W 2420/42* (2013.01); *B60W 2520/10* (2013.01); *B60W 2520/125* (2013.01); *B60W 2530/10* (2013.01); *B60W 2552/30* (2020.02); *B60Y 2200/12* (2013.01); *B62J 45/412* (2020.02)

(56) References Cited

U.S. PATENT DOCUMENTS

| | | | | |
|---|---|---|---|---|
| 2010/0079590 | A1* | 4/2010 | Kuehnle | ............ G06K 9/00798 348/118 |
| 2011/0222732 | A1* | 9/2011 | Higuchi | ................ B60W 30/14 382/104 |
| 2015/0274019 | A1* | 10/2015 | Matsuda | ................ B62K 11/04 701/22 |
| 2015/0298611 | A1* | 10/2015 | Komoguchi | ........... G08G 1/166 340/435 |
| 2016/0200317 | A1* | 7/2016 | Danzl | .................... B60K 28/06 701/25 |

FOREIGN PATENT DOCUMENTS

| | | |
|---|---|---|
| CN | 102132335 A | 7/2011 |
| CN | 102649408 A | 8/2012 |
| DE | 102012201802 A1 | 8/2013 |
| DE | 102013200435 A1 | 7/2014 |
| EP | 2696333 A1 | 2/2014 |
| JP | 08205306 | 8/1996 |
| JP | 2002140800 | 5/2002 |
| JP | 2009023655 | 2/2009 |
| JP | 2009061975 A | 3/2009 |
| JP | 2009154637 | 7/2009 |

OTHER PUBLICATIONS

International Search Report for Application No. PCT/JP2015/066993 dated Aug. 25, 2015 (English Translation, 2 pages).

* cited by examiner

[FIG. 1]
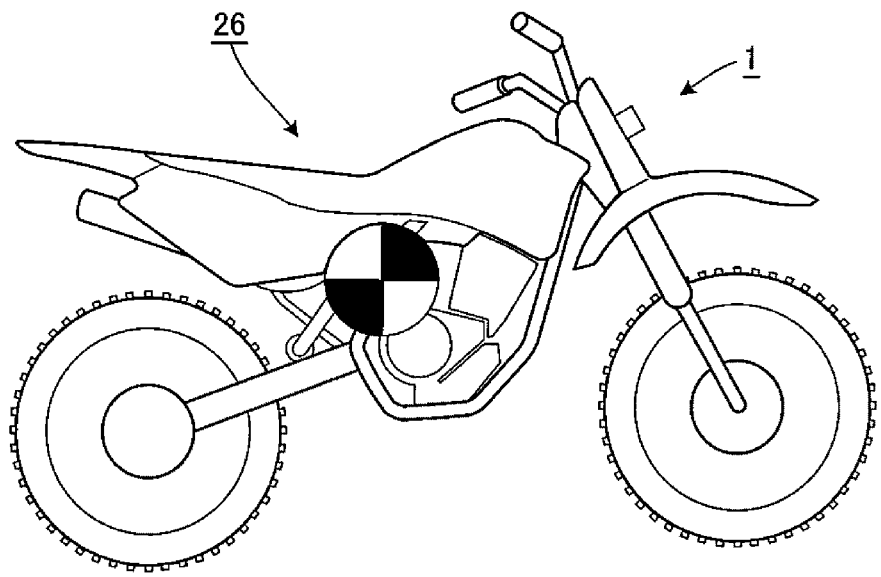
[FIG. 2]
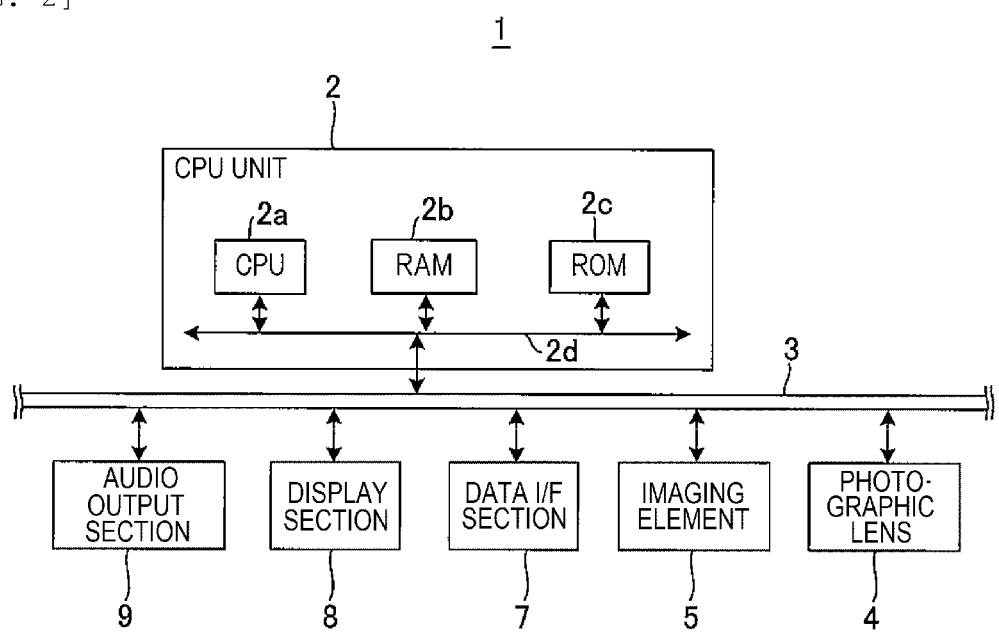

[FIG. 3]
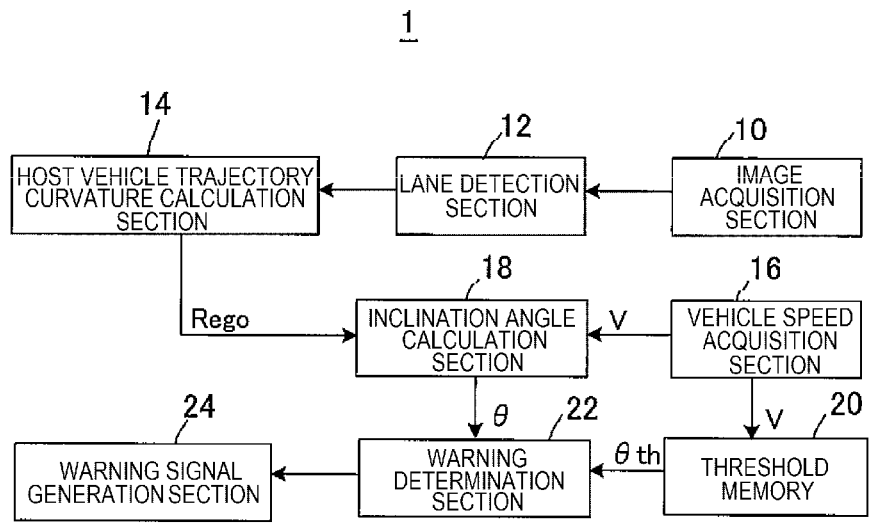

[FIG. 4]
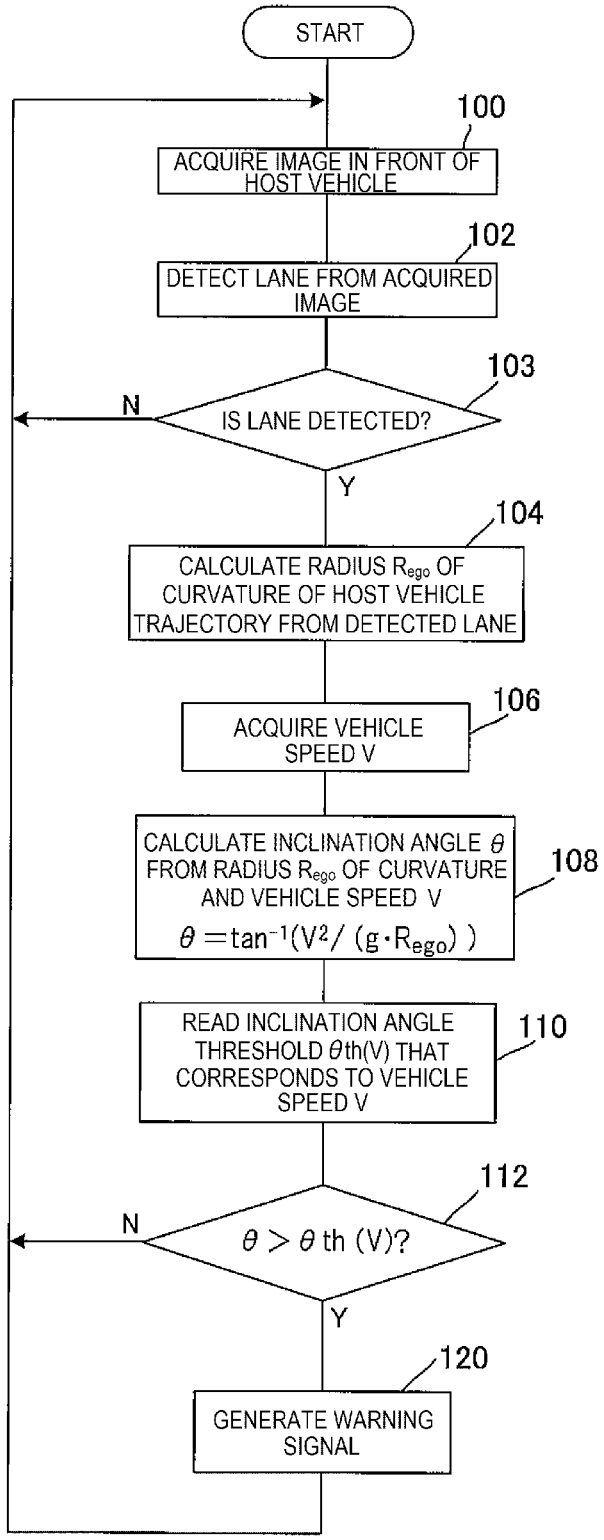

[FIG. 5]
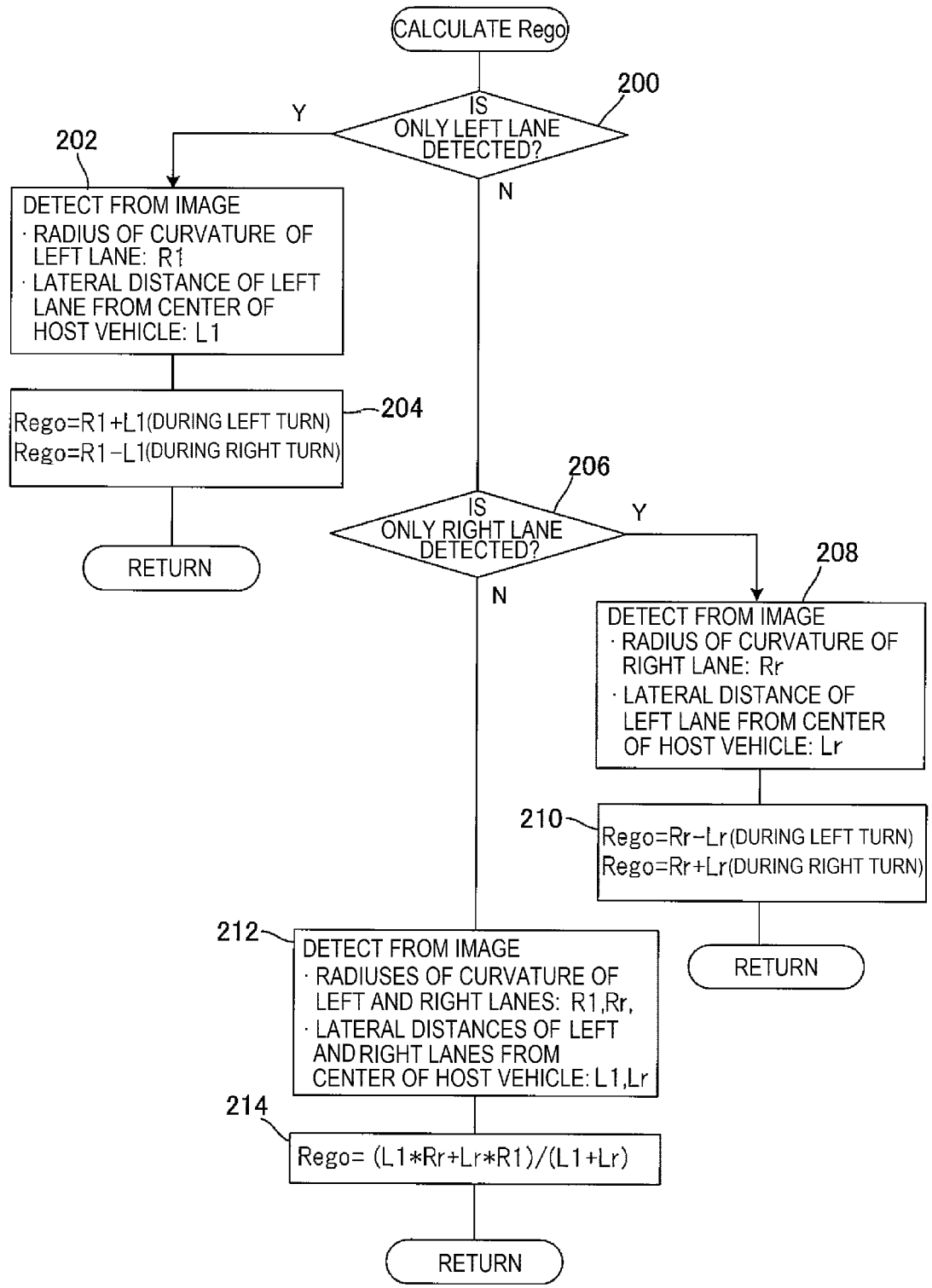

[FIG. 6]
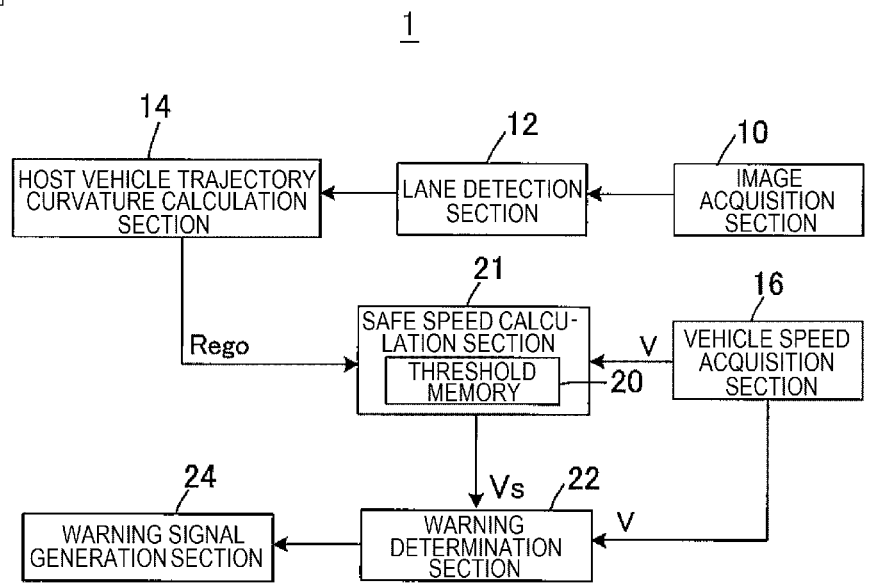

[FIG. 7]
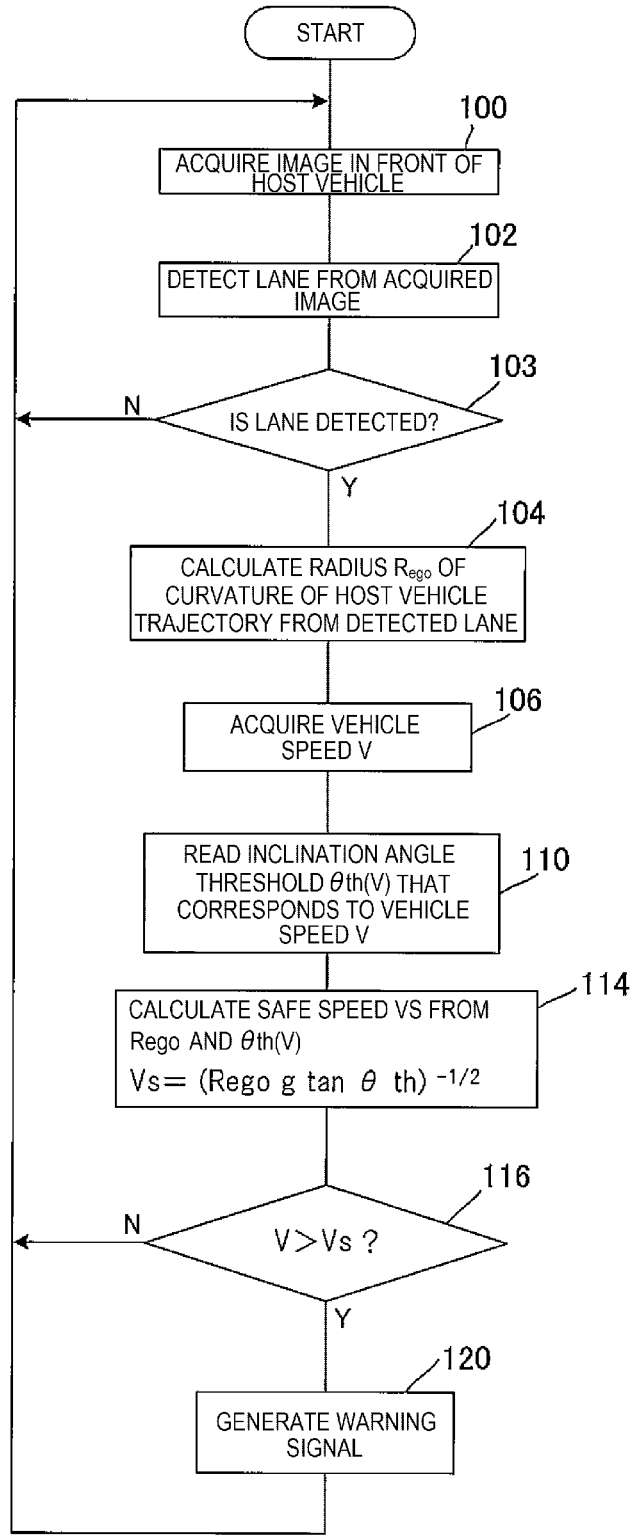

[FIG. 8]
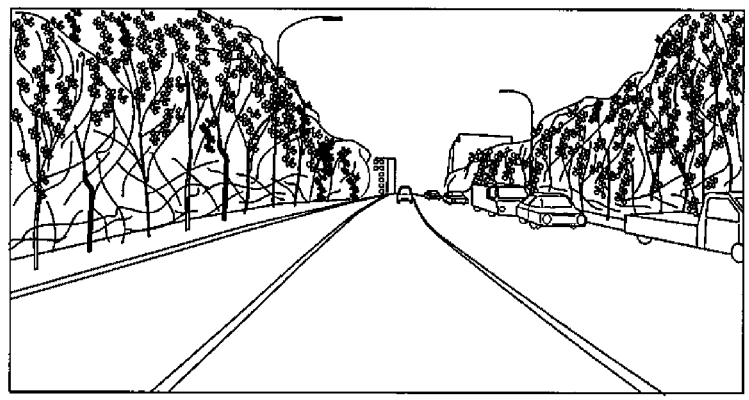
[FIG. 9]
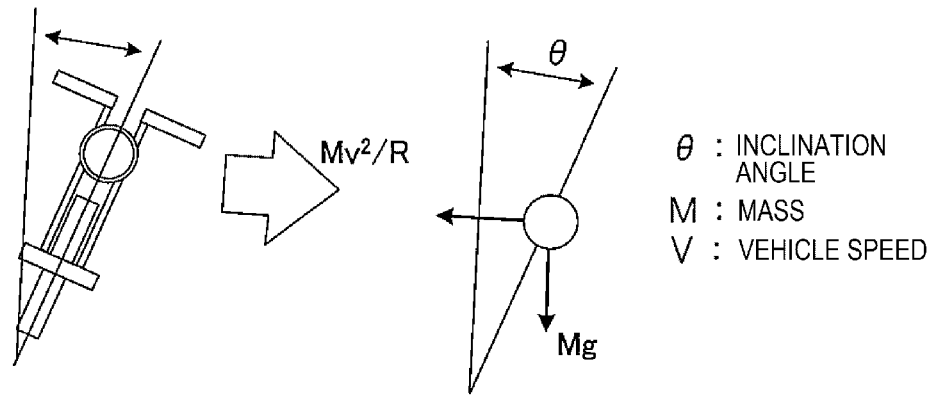
θ : INCLINATION ANGLE
M : MASS
V : VEHICLE SPEED
[FIG. 10]
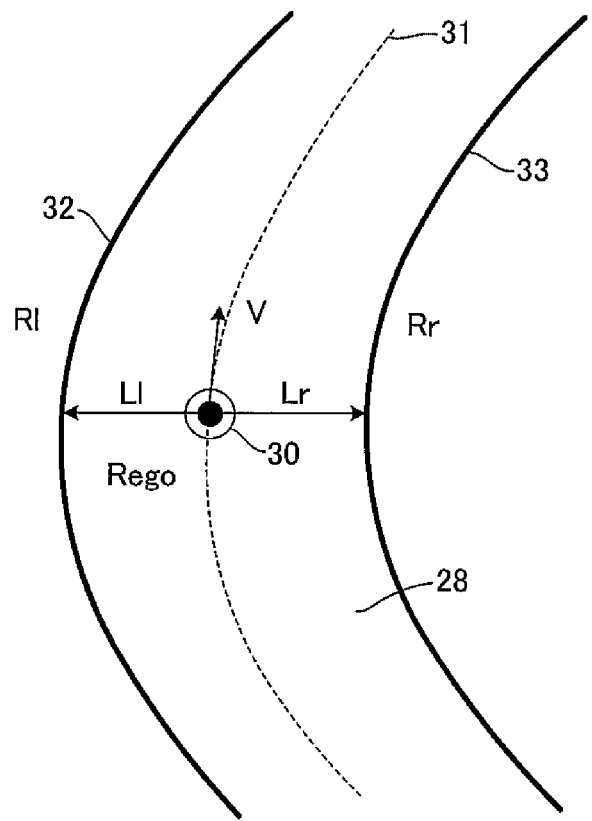

INFORMATION PROVIDING DEVICE AND PROGRAM FOR MOTORCYCLE

BACKGROUND OF THE INVENTION

The present invention relates to an information providing device and a program for a motorcycle.

A technique for a motorcycle that provides a rider with a necessary warning in accordance with a travel state and a road condition has conventionally been developed.

For example, JP-A-2002-140800 discloses a technique of: receiving road information that is transmitted from a DSRC antenna mounted on a road side; recognizing a radius R of curvature of a road from the information; and calculating a bank angle θ (an inclination angle) of the motorcycle on the basis of the recognized radius R of curvature, a detected vehicle speed V, and a detected gravitational acceleration g. According to the technique of JP-A-2002-140800, in the case where the bank angle θ becomes at least equal to a prescribed value (10°), a flashing interval of a lamp and a duration of warning sound are shortened and volume of the warning sound is increased as the vehicle speed V is increased. In this way, the rider is alerted.

In addition, JP-A-2009-23655 discloses a technique of acquiring a bank angle of a host vehicle and displaying the bank angle along a travel course. In one example of JP-A-2009-23655, a GPS is used to detect a position of the host vehicle, the radius R of curvature of the road at the current position is computed from map data in a navigation system, and the bank angle θ is acquired from the vehicle speed V and the radius R of curvature.

However, in the above related art, acquisition of the bank angle θ relies on communication means mounted on the road side or the GPS. Thus, the bank angle θ cannot be acquired during communication failure. In addition, because the road information, which is transmitted from the road side, and the GPS and navigation information do not include position information of the host vehicle in a road width direction, it is difficult to accurately measure the bank angle.

Note that another example is described in JP-A-2002-140800 (paragraph [0103]). In the other example, a course or a point is identified by a road surface marking, a surrounding building, and the like that are recognized by an image-recognition device, and coordinates are thereby specified by the identification. However, JP-A-2009-23655 does not disclose a way of using the position of the host vehicle that is recognized by the image-recognition device.

SUMMARY OF THE INVENTION

The invention has been made in view of the above facts and therefore has a purpose of providing an information providing device and a program for a motorcycle capable of accurately calculating a radius of curvature of a host vehicle trajectory regardless of a communication condition in consideration of a lateral position of the host vehicle without depending on external communication means and thereby issuing an appropriate warning during a turn.

In order to solve the above problem, an information providing device according to one aspect of the invention is configured by including: an image acquisition section that acquires an image of a road on which a host vehicle travels; a lane detection section that detects at least one of a left lane and a right lane from the image of the road acquired by the image acquisition section, and detects: a radius of curvature of the at least one detected lane or a first value related thereto; and a lateral distance from the host vehicle to the at least one lane or a second value related thereto; a host vehicle trajectory curvature calculation section that calculates a radius of curvature of a host vehicle trajectory or a value related thereto on the basis of the first value and the second value of the at least one lane; a vehicle speed acquisition section that acquires a vehicle speed of the host vehicle; a host vehicle physical quantity calculation section that calculates a physical quantity related to a turn of the host vehicle on the basis of either one of the radius of curvature of the host vehicle trajectory and the value related thereto and the vehicle speed; a warning determination section that determines whether a warning should be issued on the basis of the physical quantity that is related to the turn of the host vehicle; and a warning signal generation section that generates a warning signal when the warning determination section determines that the warning should be issued.

Preferably, the host vehicle trajectory curvature calculation section calculates the radius of curvature of the host vehicle trajectory or the value related thereto on the basis of the first value and the second value of each of the left lane and the right lane when both of the left lane and the right lane are detected. The host vehicle trajectory curvature calculation section calculates the radius of curvature of the host vehicle trajectory or the value related thereto on the basis of the first value and the second value of either one of the lanes when either one of the left lane and the right lane is detected.

The physical quantity that is related to the turn is derived from a balancing condition between a centrifugal force and weight of the host vehicle during the turn. As one example, the physical quantity that is related to the turn is an inclination angle of the host vehicle. In this case, the warning determination section determines that the warning should be issued when the inclination angle of the host vehicle exceeds a threshold of the inclination angle that is set at every vehicle speed. In another example, the physical quantity that is related to the turn is a safe speed that represents a standard with which the host vehicle can travel safely along the host vehicle trajectory with the radius of curvature of the host vehicle trajectory. In this case, the warning determination section determines that the warning should be issued when the vehicle speed of the host vehicle exceeds the safe speed.

A program that controls an information providing device according to another aspect of the invention makes the information providing device execute the following: an image acquisition step of acquiring an image of a road on which a host vehicle travels; a lane detection step of detecting at least one of a left lane and a right lane from the image of the road acquired in the image acquisition step and detecting: a radius of curvature of the at least one detected lane or a first value related thereto; and a lateral distance from the host vehicle to the at least one lane or a second value related thereto; a host vehicle trajectory curvature calculation step of calculating a radius of curvature of a host vehicle trajectory or a value related thereto on the basis of the first value and the second value of the at least one lane; a vehicle speed acquisition step of acquiring a vehicle speed of the host vehicle; a host vehicle physical quantity calculation step of calculating a physical quantity related to a turn of the host vehicle on the basis of either one of the radius of curvature of the host vehicle trajectory and the value related thereto and the vehicle speed; a warning determination step of determining whether a warning should be issued on the basis of the physical quantity that is related to the turn of the host vehicle; and a warning signal generation step of generating a warning signal when it is determined in the warning determination step that the warning should be issued.

Advantageous Effects of Invention

According to the invention, the lane is detected from the acquired image of the road, and the radius of curvature of the host vehicle trajectory is calculated on the basis of the curvature of the detected lane and the lateral distance. Thus, the physical quantity that is related to the turn of the host vehicle can be calculated extremely accurately, and the appropriate warning can be issued to a rider. In addition, the invention does not rely on information providing facility on a road side and a GPS. Thus, the radius of curvature of the host vehicle trajectory can stably be calculated without depending on presence or absence of the facility and a radio wave condition.

BRIEF DESCRIPTION OF THE DRAWINGS

FIG. 1 is a side view of a motorcycle on which an information providing device according to an embodiment of the invention is mounted.

FIG. 2 is a circuit block diagram of the information providing device according to the embodiment of the invention.

FIG. 3 is a functional block diagram of an information providing device according to a first embodiment of the invention.

FIG. 4 is a flowchart of a process flow by the information providing device according to the first embodiment of the invention.

FIG. 5 is a flowchart of a process flow of calculating a radius Rego of curvature of a host vehicle trajectory.

FIG. 6 is a functional block diagram of an information providing device according to a second embodiment of the invention.

FIG. 7 is a flowchart of a process flow by the information providing device according to the second embodiment depicted in FIG. 6.

FIG. 8 is one example of an image in front of the motorcycle that is captured by the information providing device according to the embodiment of the invention.

FIG. 9 is an explanatory view for computing an inclination angle θ of the motorcycle.

FIG. 10 is a schematic view of various parameters at a time when the radius Rego of curvature of a vehicle trajectory is calculated.

DETAILED DESCRIPTION

FIG. 1 depicts a motorcycle 26 on which an information providing device 1 according to an embodiment of the invention is mounted. As will be described below, the information providing device 1 has an imaging function and is attached to a position that is appropriate in terms of capturing of an image in front of the motorcycle 26.

As depicted in FIG. 2, the information providing device 1 includes: a CPU unit 2; a photographic lens 4; an imaging element 5 that detects light imaged by the photographic lens 4 to create an image; a data interface section 7 that exchanges data with the outside of the information providing device 1 either wirelessly or by wire; a display section 8 that displays a visual warning message; and an audio output section 9 that outputs an audio warning message. These components are connected to a system bus 3 in a mutually communicable manner.

The CPU unit 2 includes a CPU 2a, a RAM 2b, and a ROM 2c. These components are connected via an internal bus 2d in a mutually communicable manner. The internal bus 2d is connected to the system bus 3. The CPU 2a executes an information providing process according to the embodiment of the invention on the basis of an information providing program that is stored in the ROM 2c in advance. Note that the ROM 2c may be a rewritable ROM and may store a program and data that are downloaded from the Internet or a computer.

The CPU 2a transmits a command to the other components via the internal bus 2d and the system bus 3 and thereby controls the other components. Data from the other component, for example, image data transmitted from the imaging element 5, is transferred to the RAM 2b via the system bus 3 and the internal bus 2d. The CPU 2a executes various types of calculation and recognition processes on the image data that is stored in the RAM 2b.

FIG. 3 is a functional block diagram of the information providing device 1 according to a first embodiment. The information providing device 1 of this embodiment includes: an image acquisition section 10 that acquires an image of a road on which the motorcycle 26 travels; a lane detection section 12 that detects a lane from the image of the road acquired by the image acquisition section 10 and extracts information on the lane; a host vehicle trajectory curvature calculation section 14 that calculates curvature Rego of a trajectory of the motorcycle 26 (a host vehicle) from the lane detected by the lane detection section 12 and the information thereon; a vehicle speed acquisition section 16 that acquires a vehicle speed V of the motorcycle 26; an inclination angle calculation section 18 that calculates an inclination angle θ of the motorcycle 26 on the basis of the curvature Rego of the host vehicle trajectory; a threshold memory 20 that stores a threshold θth of the inclination angle at every vehicle speed V; a warning determination section 22 that compares the inclination angle θ of the motorcycle 26 and the threshold θth to determine whether to issue the warning; and a warning signal generation section 24 that generates a warning signal when the warning determination section 22 determines that the warning should be issued.

The image acquisition section 10 can be realized by using the photographic lens 4 and the imaging element 5 that are provided in the information providing device 1 and are depicted in FIG. 2. Needless to say, the image acquisition section 10 is not limited to this example. The image acquisition section 10 may acquire image data that is transmitted to the information providing device 1 wirelessly or by wire from an independent camera from the information providing device 1 (for example, a camera in a mobile terminal that is attached to the motorcycle 26) via the data interface section 7 in FIG. 2.

The lane detection section 12 can be realized when the CPU 2a executes an image analysis program that is stored in the ROM 2c. A program that is known in the technical field can be used as the image analysis program.

A vehicle speed detection section 16 can be realized when the CPU 2a receives a vehicle speed pulse signal that is output from a vehicle sensor (not depicted) attached to the motorcycle 26 via the data interface section 7 in FIG. 2 and counts the received pulse signal.

The threshold memory 20 can be realized as a specified storage area in the ROM 2c.

The host vehicle trajectory curvature calculation section 14, the inclination angle calculation section 18, and the warning determination section 22 can be realized when the CPU 2a executes a program that is stored in the ROM 2c.

The warning signal generation section 24 can be realized as the CPU 2a that generates the warning signal (a command) to make the display section 8 and the audio output section 9 in FIG. 2 issue the warnings.

Next, a description will be made on a process flow of information provision according to the embodiment of the invention. This process flow is performed when the CPU 2a executes the information providing program according to the embodiment of the invention that is stored in the ROM 2c.

As depicted in FIG. 4, the image acquisition section 10 acquires the image in front of the host vehicle (step 100). One example of this front image is depicted in FIG. 8. The image in FIG. 8 is an image at a time when the host vehicle turns on a right-hand curve. It can be understood from the image that a lane on a right side (a right lane) and a lane on a left side (a left lane) of the host vehicle are identifiable as clear lines from a periphery.

Next, the lane detection section 12 executes a process of detecting the lane from the acquired image (step 102). If the lane is detected (a positive determination in step 103), the host vehicle trajectory curvature calculation section 14 executes a process of calculating a radius Rego of curvature of the host vehicle trajectory from the detected lane (step 104). The detailed process in step 104 will be described below by using FIG. 5.

If the lane is not detected in step 102 (a negative determination in step 103), the process returns to step 100 to acquire the image in front of the host vehicle, and the process of detecting the lane from the newly-acquired image is executed (step 102).

Next, the vehicle speed acquisition section 16 acquires the vehicle speed of the host vehicle (step 106), and the inclination angle calculation section 18 calculates the inclination angle θ of the host vehicle on the basis of the vehicle speed V and the radius Rego of curvature (step 108). The inclination angle θ is acquired by the following equation.

$$\theta = \tan^{-1}(V^2/(g \cdot Rego)) \quad (1)$$

Here, g represents gravitational acceleration.

Note that, as depicted in FIG. 9, when mass of the host vehicle is set as M, the equation (1) is derived from a balance condition (Mg·tan θ=MV²/Rego) between a tangent (Mg·tan θ) of weight Mg thereof and a centrifugal force MV²/Rego that is generated during a turn.

Next, the warning determination section 22 reads the threshold θth(V) that corresponds to the vehicle speed V from the threshold memory 20, and determines whether the inclination angle θ calculated in step 108 exceeds the threshold θth (step 12). This threshold θth is set as a maximum inclination angle that allows the safe turn at the vehicle speed V and is, for example, 10 degrees at 20 km/hour, 15 degrees at 50 km/hour, and 20 degrees at 80 km/hour.

If the inclination angle θ exceeds the threshold θth (a positive determination in step 112), the warning signal generation section 24 outputs the warning signal (step 120). The output warning signal is transmitted to the display section 8 and/or the audio output section 9 in FIG. 2, and a visual display and/or audio is thereby output. In this way, a rider is alerted. The warned rider can turn safely by reducing the vehicle speed. The process of step 100 onward is continued as needed.

On the other hand, if the inclination angle θ does not exceed the threshold θth (a negative determination in step 112), the warning signal is not generated, and the process of step 100 onward is repeated.

A description will be made on a process flow of a subroutine to calculate the radius Rego of curvature of the host vehicle trajectory in step 104 by using a flowchart in FIG. 5 with reference to FIG. 10. Note that FIG. 10 depicts a state where a host vehicle 30 travels on a road 28 in an arrow direction at the vehicle speed V, the road 28 having a left lane 32 and a right lane 33.

As depicted in FIG. 5, the host vehicle trajectory curvature calculation section 14 determines whether only the "left lane 32" is detected by the lane detection section 12 from the image that is acquired by the image acquisition section 10 (step 200). If only the "left lane 32" is detected (a positive determination in step 200), a radius Rl of curvature of the left lane 32 and a lateral distance Ll of the left lane 32 from the center of the host vehicle 30 are detected from the detected image of the left lane 32 (step 202). Next, in accordance with the following equation, the radius Rego of curvature of a trajectory 31 of the host vehicle 30 is calculated from the radius Rl of curvature and the lateral distance Ll of the left lane 32 (step 204).

$$Rego=Rl+Ll \text{(during a left turn)} \quad (2a)$$

$$Rego=Rl-Ll \text{(during a right turn)} \quad (2b)$$

FIG. 10 depicts the example during the right turn. Thus, it can easily be understood from the drawing that the radius Rego of curvature of the host vehicle trajectory 31 equals a value that is acquired by subtracting the lateral distance Ll from the radius Rl of curvature of the left lane 32 (the equation (2a)). Meanwhile, during the left turn, the host vehicle 30 turns while the host vehicle trajectory 31 draws an arc with a larger radius than that of the left lane 32. Thus, it is apparent that the radius Rego of curvature of the host vehicle trajectory 31 equals a value that is acquired by adding the radius Rl of curvature and the lateral distance Ll of the left lane 32 (the equation (2b)). Once the radius Rego of curvature of the host vehicle trajectory 31 is calculated, this subroutine returns.

If not only the left lane 32 is detected (a negative determination in step 200), the host vehicle trajectory curvature calculation section 14 determines whether only the "right lane 33" is detected by the lane detection section 12 from the image that is acquired by the image acquisition section 10 (step 206). If only the "right lane 33" is detected (a positive determination in step 206), a radius Rr of curvature of the right lane 33 and a lateral distance Lr of the right lane 33 from the center of the host vehicle 30 are detected from the detected image of the right lane 33 (step 208). Next, in accordance with the following equation, the radius Rego of curvature of the trajectory 31 of the host vehicle 30 is calculated from the radius Rr of curvature and the lateral distance Lr of the right lane 33 (step 210).

$$Rego=Rr-Lr \text{(during the left turn)} \quad (3a)$$

$$Rego=Rr+Lr \text{(during the right turn)} \quad (3b)$$

FIG. 10 shows the example during the right turn, and the host vehicle 30 turns while the host vehicle trajectory 31 draws the arc with the larger radius than that of the right lane 33. Thus, it can easily be understood from the drawing that the radius Rego of curvature of the host vehicle trajectory 31 equals a value that is acquired by adding the radius Rr of curvature and the lateral distance Lr of the right lane 33 (the equation (3a)). Meanwhile, it is apparent that the radius Rego of curvature of the host vehicle trajectory 31 equals a value that is acquired by subtracting the lateral distance Lr from the radius Rr of curvature of the right lane 33 during the left turn (the equation (3b)). Once the radius Rego of curvature of the host vehicle trajectory 31 is calculated, this subroutine returns.

If it is determined in step 206 that not only the right lane 33 is detected, such a case corresponds to a case where both of the left lane 32 and the right lane 33 are detected. In this case, the radiuses (Rl, Rr) of curvature of the left and right lanes (32, 33) and the lateral distances (Ll, Lr) of the left and right lanes (32, 33) from the center of the host vehicle 30 are detected (step 212). Next, in accordance with the following equation, the radius Rego of curvature of the host vehicle trajectory 31 is calculated from the radiuses of curvature and the lateral distances of the left and right lanes (step 214).

$$Rego=(Ll\cdot Rr+Lr\cdot Rl)/(Ll+Lr) \quad (4)$$

Once the radius Rego of curvature of the host vehicle trajectory 31 is calculated, this subroutine returns, and the process returns to the main routine in FIG. 4.

As it has been described so far, according to this embodiment, the lane is detected from the acquired image of the road, and the radius of curvature of the host vehicle trajectory is calculated on the basis of the curvature and the lateral distance of the detected lane. Thus, the inclination angle θ can be calculated extremely accurately, and the appropriate warning can be issued to the rider. In addition, this embodiment does not rely on information providing facility on the road side and the GPS. Thus, the accurate position of the host vehicle can stably be detected without depending on presence or absence of the facility and a radio wave condition.

In the first embodiment, the warning is issued when the inclination angle θ exceeds the threshold in the flowchart in FIG. 4. A measure that should first be taken by the warned rider is to reduce the vehicle speed. Thus, it is considered that issuing of the warning on the basis of the vehicle speed V is preferable to that on the basis of the inclination angle θ.

FIG. 6 depicts a functional block diagram of a second embodiment. Note that, in FIG. 6, the similar components to those in FIG. 3 are denoted by the same reference signs and the detailed description thereon will not be made.

As depicted in FIG. 6, instead of the inclination angle calculation section 18, a safe speed calculation section 21 is provided in the second embodiment. In accordance with the following equation, the safe speed calculation section 21 calculates a safe speed Vs from the radius Rego of curvature of the host vehicle trajectory 31, which is calculated by the host vehicle trajectory curvature calculation section 14, and the threshold θth of the inclination angle at the current vehicle speed V, which is acquired from the threshold memory 20.

$$Vs=(Rego\cdot g\cdot \tan \theta th)^{-1/2} \quad (5)$$

The equation (5) can be calculated by solving the equation (1) for V with the vehicle speed V at the inclination angle θth being the safe speed Vs. The safe speed Vs represents a standard with which the host vehicle can travel safely along the host vehicle trajectory with the radius of curvature of the host vehicle trajectory.

Next, a description will be made on a process flow of the second embodiment by using a flowchart in FIG. 7. Note that, in the flowchart in FIG. 7, the same steps as those in the flowchart in FIG. 4 are denoted by the same reference signs and the detailed description thereon will not be made.

As depicted in FIG. 7, steps 100 to 106 that are the same as those in FIG. 4 are executed. In FIG. 4, step 108 of calculating the inclination angle θ is executed. Meanwhile, in FIG. 7, step 108 is not executed after step 106. Instead, step 110 of reading the threshold θth of the inclination angle is executed. Next, in FIG. 7, in accordance with the equation (5), the safe speed calculation section 21 calculates the safe speed Vs from the radius Rego of curvature of the host vehicle trajectory 31, which is calculated in step 104, and the threshold θth of the inclination angle at the current vehicle speed V (step 114).

Next, the warning determination section 22 in FIG. 6 determines whether the vehicle speed V exceeds the safe speed Vs (step 116). If the vehicle speed V exceeds the safe speed Vs (a positive determination in step 116), the warning signal generation section 24 outputs the warning signal (step 120). The output warning signal is transmitted to the display section 8 and/or the audio output section 9 in FIG. 2, and the visual display and/or the audio is thereby output. In this way, the rider is alerted. The warned rider can turn safely by reducing the vehicle speed. The process of step 100 onward is continued as needed.

On the other hand, if the vehicle speed V does not exceed the safe speed Vs (a negative determination in step 116), the warning signal generation section 24 does not generate the warning signal, and the process of step 100 onward is repeated.

The description has been made so far on each of the embodiments of the invention of the present application. However, the invention is not limited to the above examples and can appropriately and arbitrarily be changed within the scope that does not depart from the scope of the invention.

For example, the radiuses Rl, Rr of curvature of the left and right lanes are derived in the above embodiment. However, another value, for example, the curvature itself may be used as long as the value represents the curvature of the lane. The same applies to the radius of curvature of the host vehicle trajectory. In addition, in the above embodiments, the distances Ll, Lr to the left and right lanes from the host vehicle are derived. However, another value can be used as long as the value represents the distance from the host vehicle to the lane. Needless to say, expression of each of the above equations is appropriately changed in accordance with a type of a variable to be used.

Furthermore, in the above embodiments, the inclination angle θ of the host vehicle and the safe speed Vs of the host vehicle are used to determine whether the motorcycle travels safely during the turn. However, another physical quantity can be used as long as the physical quantity can be derived from the balancing condition of the centrifugal force and the weight of the host vehicle during the turn. That is, an arbitrary quantity can be used as long as it is the physical quantity that can be obtained by changing the equation (1) or the equation (5).

Moreover, the flows of the various flowcharts can also appropriately and arbitrarily be changed. For example, in the flow in FIG. 5, it is first determined that only the left lane is detected. However, it may first be determined that only the right lane is detected. Alternatively, it may first be determined whether both of the left and right lanes are detected, and it may be determined whether either one of the left and right lanes is detected when not all of the lanes are detected.

The invention claimed is:

1. An information providing device for a motorcycle, the information providing device comprising:

an image acquisition section that acquires an image of a road on which the motorcycle travels;
a lane detection section that detects
at least one of a left lane and a right lane from the image of the road acquired by the image acquisition section,
a radius of curvature of the at least one detected lane, and
a lateral distance from the motorcycle to the at least one detected lane;
a motorcycle trajectory curvature calculation section that calculates a radius of curvature of a motorcycle trajectory on the basis of the radius of curvature of the at least one detected lane and the lateral distance from the motorcycle to the at least one detected lane;
a vehicle speed acquisition section that acquires a vehicle speed of the motorcycle;
a motorcycle physical quantity calculation section that calculates an inclination angle of the motorcycle with respect to vertical on the basis the radius of curvature of the motorcycle trajectory and the vehicle speed;
a warning determination section that determines whether a warning should be issued on the basis of the inclination angle of the motorcycle; and
a warning signal generation section that generates a warning signal when the warning determination section determines that the warning should be issued, wherein the warning should be issued when the inclination angle of the motorcycle exceeds a threshold inclination angle set for the vehicle speed.

2. The information providing device according to claim 1, wherein
the motorcycle trajectory curvature calculation section calculates the radius of curvature of the motorcycle trajectory on the basis of the radius of curvature of each of the left lane and the right lane and the lateral distance from the motorcycle to each of the left lane and the right lane when both of the left lane and the right lane are detected.

3. A non-transitory computer readable medium comprising instructions that when executed by a computer, cause the computer to execute the following:
an image acquisition step of acquiring an image of a road on which a motorcycle travels;
a lane detection step of detecting
at least one of a left lane and a right lane from the image of the road acquired in the image acquisition step,
a radius of curvature of the at least one detected lane, and
a lateral distance from the motorcycle to the at least one detected lane;
a motorcycle trajectory curvature calculation step of calculating a radius of curvature of a motorcycle trajectory on the basis of the radius of curvature of the at least one detected lane and the lateral distance from the motorcycle to the at least one detected lane;
a vehicle speed acquisition step of acquiring a vehicle speed of the motorcycle;
a motorcycle physical quantity calculation step of calculating an inclination angle of the motorcycle with respect to vertical on the basis of the radius of curvature of the motorcycle trajectory and the vehicle speed;
a warning determination step of determining whether a warning should be issued on the basis of the inclination angle of the motorcycle; and
a warning signal generation step of generating a warning signal when it is determined in the warning determination step that the warning should be issued, wherein the warning should be issued when the inclination angle of the motorcycle exceeds a threshold inclination angle set for the vehicle speed.

4. The non-transitory computer readable medium according to claim 3, wherein
in the motorcycle trajectory curvature calculation step, the radius of curvature of the motorcycle trajectory is calculated on the basis of the radius of curvature of each of the left lane and the right lane and the lateral distance of the motorcycle to each of the left lane and the right lane when both of the left lane and the right lane are detected.

5. An information providing device for a motorcycle, the information providing device comprising:
an image acquisition section that acquires an image of a road on which the motorcycle travels;
a lane detection section that detects at least one of a left lane and a right lane from the image of the road acquired by the image acquisition section, and detects:
a radius of curvature of the at least one detected lane and a lateral distance from the motorcycle to the at least one lane;
a motorcycle trajectory curvature calculation section that calculates a radius of curvature of a motorcycle trajectory on the basis of the radius of curvature of the at least one detected lane and the lateral distance from the motorcycle to the at least one lane;
a vehicle speed acquisition section that acquires a vehicle speed of the motorcycle;
a motorcycle physical quantity calculation section that calculates a safe speed with which the motorcycle can travel safely along the motorcycle trajectory with the radius of curvature of the motorcycle trajectory on the basis of the radius of curvature of the motorcycle trajectory and an inclination angle of the motorcycle with respect to vertical that is set at every vehicle speed;
a warning determination section that determines whether a warning should be issued on the basis of the safe speed with which the motorcycle can travel safely along the motorcycle trajectory with the radius of curvature of the motorcycle trajectory; and
a warning signal generation section that generates a warning signal when the warning determination section determines that the warning should be issued, wherein the warning should be issued when the vehicle speed of the motorcycle exceeds the safe speed.

6. The information providing device according to claim 5, wherein
the motorcycle trajectory curvature calculation section calculates the radius of curvature of the motorcycle trajectory on the basis of the radius of curvature of each of the left lane and the right lane and the lateral distance from the motorcycle to each of the left lane and the right lane when both of the left lane and the right lane are detected.

7. A non-transitory computer readable medium comprising instructions that when executed by a computer, cause the computer to execute the following:
an image acquisition step of acquiring an image of a road on which the motorcycle travels;
a lane detection step of detecting
at least one of a left lane and a right lane from the image of the road acquired in the image acquisition step,
a radius of curvature of the at least one detected lane, and a lateral distance from the motorcycle to the at least one detected lane;

a motorcycle trajectory curvature calculation step of calculating a radius of curvature of a motorcycle trajectory on the basis of the radius of curvature of the at least one detected lane and the lateral distance from the motorcycle to the at least one detected lane;

a vehicle speed acquisition step of acquiring a vehicle speed of the motorcycle;

a motorcycle physical quantity calculation step of calculating a safe speed with which the motorcycle can travel safely along the motorcycle trajectory with the radius of curvature of the motorcycle trajectory on the basis of the radius of curvature of the motorcycle trajectory and an inclination angle of the motorcycle with respect to vertical that is set at every vehicle speed;

a warning determination step of determining whether a warning should be issued on the basis of the safe speed with which the motorcycle can travel safely along the motorcycle trajectory with the radius of curvature of the motorcycle trajectory; and a warning signal generation step of generating a warning signal when it is determined in the warning determination step that the warning should be issued, wherein the warning should be issued when the vehicle speed of the motorcycle exceeds the safe speed.

8. The non-transitory computer readable medium according to claim 7, wherein in the motorcycle trajectory curvature calculation step, the radius of curvature of the motorcycle trajectory is calculated on the basis of the radius of curvature of each of the left lane and the right lane and the lateral distance from the motorcycle from each of the left lane and the right lane when both of the left lane and the right lane are detected.

* * * * *